United States Patent [19]

Mizuno

[11] Patent Number: 5,464,654
[45] Date of Patent: Nov. 7, 1995

[54] HYDROGEN-OCCLUSION ELECTRODE AND A METHOD OF MANUFACTURING THE ELECTRODE

[75] Inventor: Takashi Mizuno, Iwaki, Japan

[73] Assignee: Furukawa Denchi Kabushiki Kaisha, Japan

[21] Appl. No.: 273,138

[22] Filed: Jul. 14, 1994

Related U.S. Application Data

[62] Division of Ser. No. 74,452, Jun. 10, 1993, Pat. No. 5,360,687.

[30] Foreign Application Priority Data

Dec. 6, 1992 [JP] Japan ................................. 4-179462
Dec. 6, 1992 [JP] Japan ................................. 4-179463

[51] Int. Cl.$^6$ ................................................. H01M 4/04
[52] U.S. Cl. ............................................. 427/123; 29/623.5
[58] Field of Search .......................... 420/900; 427/123; 29/623.5

[56] References Cited

U.S. PATENT DOCUMENTS 5,053,292 10/1991 Hasebe et al. ........................ 429/101
5,100,747 3/1992 Hayashida et al. ................... 29/623.5
5,238,756 8/1993 Fetcenko et al. .................... 420/900 X Primary Examiner—Stephen Kalafut
Attorney, Agent, or Firm—Breiner & Breiner

[57] ABSTRACT

A hydrogen-occlusion electrode and a method of manufacturing the electrode are described. The hydrogen-occlusion electrode comprises from about 42–84 vol. % of a hydrogen-occlusion alloy, from about 3–13 vol. % of a bonding material, from about 3–15 vol. % of an electroconductive material, and has residual pores in an amount of 10–30 vol. %. The electroconductive material has an average particle size of 1.3 μm or less. The bonding material is preferably polyvinylidene fluoride (PVdf). In manufacturing the foregoing hydrogen-occlusion electrode, a formed electrode plate body including PVdF as a bonding material is heat-treated in a vacuum or inert gas atmosphere at a temperature ranging from about 160° C. to about 200° C. An electrode is thereby obtained wherein the alloy particles are prevented from separating from the electrode resulting in an improvement of mechanical strength and electroconductivity in the electrode. When the hydrogen-occlusion electrode includes a thickener in an amount of not more than about 0.5 wt. % based on the weight of the hydrogen-occlusion alloy, improvements in the charge-discharge characteristics and the internal pressure of the battery are obtained.

1 Claim, 2 Drawing Sheets 5,464,654

HYDROGEN-OCCLUSION ELECTRODE AND A METHOD OF MANUFACTURING THE ELECTRODE

This is a division of application Ser. No. 08/074,452 filed Jun. 10, 1993, now U.S. Pat. No. 5,360,687.

FIELD OF INVENTION

The invention relates to a hydrogen-occlusion electrode and a method of manufacturing such electrode.

BACKGROUND OF INVENTION

A hydrogen-occlusion electrode primarily composed of a hydrogen-occlusion alloy capable of occluding and releasing hydrogen has previously been proposed for use as a negative electrode of a sealed-type alkaline storage battery in which hydrogen is used as the active material for the negative electrode. To manufacture this type of hydrogen-occlusion electrode, a polytetrafluoroethylene (PTFE) powder or a polyethylene (PE) powder, which serves as a bonding material, is mixed with a hydrogen-occlusion alloy powder which is the main component of the electrode. The mixture is heated sufficiently to bond the alloy powder particles together. Alternatively, an unsintered PTFE powder is mixed with a hydrogen-occlusion alloy powder and formed into fibers. During the formation of these fibers, particles of the alloy powder are bonded to one another in order to prevent the alloy powder particles from separating from the formed fibers. In this case, it has been the general practice to add an electroconductive material, such as a nickel (Ni) powder, to the mixture to increase the conductivity of the electrode. Further, a thickener, such as carboxymethylcellulose (CMC) is added to the mixture to make the mixture a slurry. The resultant slurry mixture can then be applied to a porous or perforated electroconductive substrate, dried and pressed to a predetermined thickness to form an electrode plate body. This body is thereafter heat-treated in a vacuum or inert gas atmosphere to produce a hydrogen-occlusion electrode.

With the types of hydrogen-occlusion electrodes manufactured by the above-identified conventional manufacturing methods, however, it has been found that as the electrode is repeatedly subjected to charge-discharge operations in an alkaline electrolyte while in use as a negative electrode of a storage battery, pulverization of the hydrogen-occlusion alloy powder contained in the electrode takes place resulting in finer-sized particles of the hydrogen alloy powder which separate from the electrode. This results in not only a capacity decrease in the battery, but also a sharp deterioration in both the mechanical strength and electroconductivity of the electrode, thereby making it difficult to maintain a high capacity rate for a long time.

Further, it has been the general practice with convention hydrogen-occlusion electrodes containing a thickener, that the thickener be present in an amount of about 1 wt. % based on the weight of the hydrogen-occlusion alloy of the electrode. However, this has been found to cause the surfaces of the alloy particles to become covered with the thickener resulting in lower electrode activity, a comparatively short life in terms of charge-discharge cycles, and a higher internal pressure for the sealed-type storage battery containing the electrode. It is desired to avoid these disadvantages.

OBJECTS AND BRIEF DESCRIPTION OF THE INVENTION

A primary object of the present invention is to provide a hydrogen-occlusion electrode which avoids the above-described disadvantages and has an improved charge-discharge cycle life, capacity retention or preservation rate, and the like.

A hydrogen-occlusion electrode according to the present invention is characterized in that it comprises, based on the volume percentage of the electrode, a mixture of from about 42–84 volume % of a hydrogen-occlusion alloy, from about 3–13 volume % of a bonding material, from about 3–15 volume % of an electroconductive material, and includes from about 10–30 volume % of residual pores. The preferred bonding material is polyvinylidene fluoride (PVdf) and the electroconductive material preferably has an average particle size of 1.3 μm or smaller. The electrode components are heat-treated following mixture to form the electrode.

Another object of the present invention is to provide a method of manufacturing a hydrogen-occlusion electrode which avoids the disadvantages of prior electrodes as above described and improves the properties of the produced battery, such as charge-discharge cycle life, discharge characteristics, and the like.

The method of manufacturing a hydrogen-occlusion electrode according to the present invention is characterized in that an electrode plate body is formed using polyvinylidene fluoride as a bonding material, and the formed electrode plate body is heat-treated in a vacuum or inert gas atmosphere at a temperature in the range of about 160° C. to about 200° C.

Further, another object of the present invention is to provide a hydrogen-occlusion electrode which avoids the disadvantages of prior electrodes as above described by manufacturing an electrode according to the following method: (1) mixing a hydrogen-occlusion alloy powder as a main component, an electroconductive material, a bonding material and a thickener together with water to make a slurry mixture, (2) applying the resultant slurry mixture to an electroconductive porous or perforated substrate, and (3) drying and pressing the substrate, wherein the thickener is present in an amount of not more than about 0.5 wt. % based on the weight of the hydrogen-occlusion alloy. This method serves to improve the electrode's charge-discharge cycle life characteristics and the internal pressure of the sealed-type storage battery containing an electrode so produced. Preferred thickeners suitable for use include carboxymethylcellulose (CMC), methyl cellulose (MC), polyvinyl alcohol (PVA), hydroxy-propylmethyl cellulose (HPMC), polyethylene oxide (PEO) or the like. In use, the thickener which is present in an amount of from about 0.01 to about 0.5 wt. % based on the weight of the hydrogen-occlusion alloy is preferably dissolved in water or an organic solvent and used in the form of a solution.

DETAILED DESCRIPTION OF PRESENTLY PREFERRED EMBODIMENTS

Figure 1:
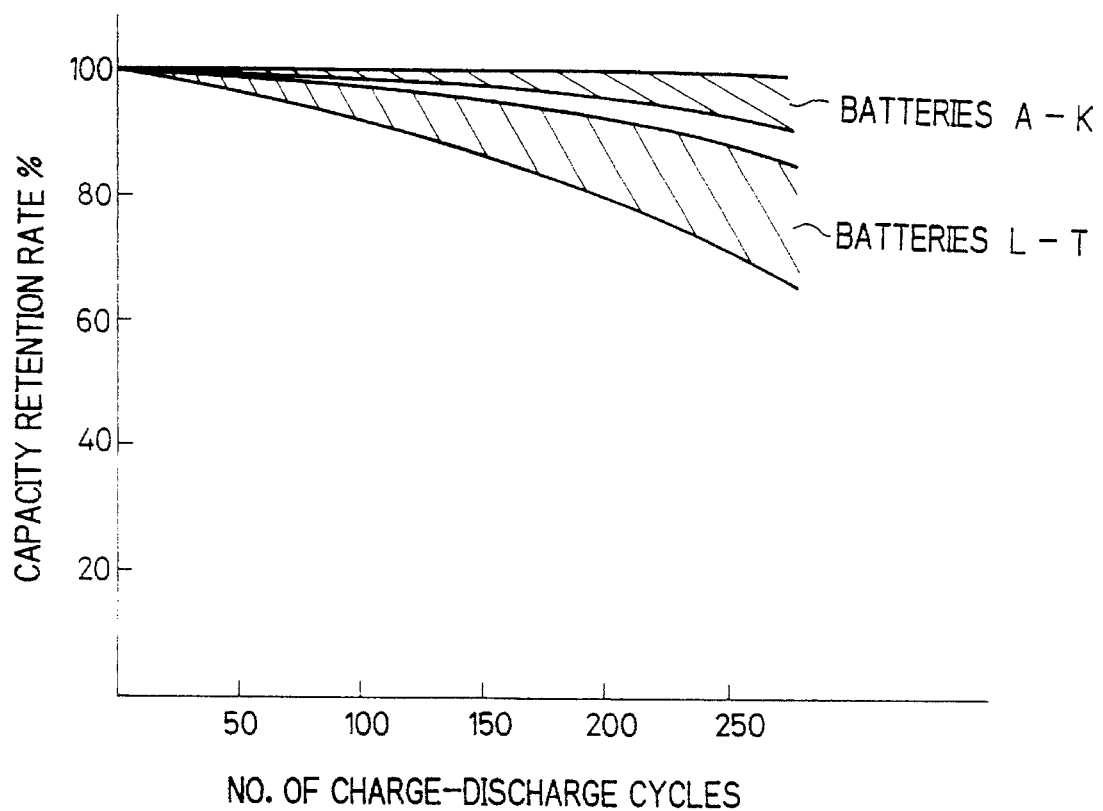
FIG. 1 is a graph showing the charge-discharge characteristics of hydrogen-occlusion electrodes manufactured according to the present invention and electrodes produced for comparison purposes.

Hydrogen-occlusion electrodes and methods of manufacturing the electrodes according to the present invention are described below including through specific examples of preferred embodiments.

A hydrogen-occlusion alloy useful for use in manufacturing a hydrogen-occlusion electrode according to the present invention can be an alloy of a misch metal-nickel (MmNi) system or of any other known composition suitable for the desired use in an electrode. Misch metal as used herein refers to a mixed rare earth metal prepared by electrolysis of fused rare earth chlorides. It has been found that in making a hydrogen-occlusion electrode according to the present invention that when the compounding ratio of the alloy in the electrode is less than 42 vol. %, a high capacity of the electrode cannot be obtained. Further, when the compounding ratio of the alloy is in excess of 84 vol. %, the relative quantities of the bonding material and the electroconductive material have to be decreased resulting in a less secure bonding of the alloy particles and a lowering of the electrode's electroconductivity. Using polyvinylidene fluoride (PVdF) as the bonding material in the hydrogen-occlusion electrode has been found to be extremely advantageous in that it is alkali-resistant and can be heat-treated sufficiently at a temperature in the range of 160° C. to 200° C. as compared with the conventionally used polytetrafluoroethylene (PTFE) which requires a much higher heating temperature as well as a special expensive furnace for its heat-treatment since its sintering temperature is as high as about 350° C. However, PTFE can be used as the bonding material within the described amounts and improvements obtained over conventional batteries. The most preferred bonding material is PVdF since this allows for use of lower processing temperatures.

Following formation of an electrode plate body using polyvinylidene fluoride and a hydrogen-occlusion alloy powder, the electrode plate body is heated at a temperature in the range of about 160° C. to about 200° C. to sinter the particles of the PVdf bonding material. This results in the bonding together or formation of a network of the particles of bonding material and the secure bonding of the particles of the powdered alloy one to another by means of the network of the bonding material. This structure has been found to accommodate the expansion and contraction in volume of the alloy and is very advantageous in use. When the heat treatment temperature is lower than about 160° C., particles of the bonding material have not sufficiently bonded to one another and, as a result, fine particles of the powdered alloy are not held securely in position by the bonding material. When the heating temperature is higher than about 200° C., undesirable surface inactivation of the alloy particles is generally caused, possibly due to a flowing of the bonding material around the alloy particles.

Suitable electroconductive materials for use in the hydrogen-occlusion electrode include any conventionally known electroconductive material as used in sealed-type storage batteries which provide good electroconductivity. Carbonyl nickel is preferred. For example, nickel powders produced by a carbonyl refining process and sold commercially by INCO Specialty Powder Products. As will be discussed further below, when the average particles size of the electroconductive material is larger than 1.3 μm, it is difficult for the material to enter the spaces between the alloy particles and sufficiently bond to the surfaces of the alloy powder, thereby resulting in a lower coefficient of utilization for the electrode.

The thickener used for making a slurry mixture of the powdered alloy, bonding material and electroconductive material, can be any conventionally known thickener, such as CMC, MC, PVA, HPMC, PEO and the like. Further, the thickener is preferably present in solution using either water or an organic solvent. This assists in mixing the components present.

Thus, a slurry having a predetermined viscosity can be prepared from a mixture which preferably comprises a desired hydrogen-occlusion alloy powder, a bonding powder, an electroconductive powder, a thickener powder and a suitable amount of water or an organic solvent. The slurry mixture is applied to both sides of a porous or perforated electroconductive substrate so as to fill in the openings in the substrate and/or form thereon a paste layer of an appropriate thickness. The pasted substrate is then dried and roll-pressed to produce a formed electrode plate body having a predetermined thickness. Thereafter, the formed electrode plate body is put into a heating chamber, such as a furnace, and heated in a vacuum atmosphere or in an inert gas atmosphere of nitrogen, argon or the like at a temperature ranging from about 160° C. to about 200° C. for a required length of time. A hydrogen-occlusion electrode is thereby made having residual pores in an amount of 10 to 30 vol. %. Where the residual pores account for less than 10 vol. %, gas absorption by the electrode is poor and where the residual pores account for more than 30 vol. %, the active material is likely to separate from the electrode and a high capacity cannot be obtained.

Examples of a preferred embodiment of the present invention is described below.

EXAMPLE 1

A hydrogen-occlusion powder was obtained by mechanically pulverizing a hydrogen-occlusion alloy comprising $MmNi_{3.5}Co_{1.0}Al_{0.5}$, a PVdF powder serving as a bonding material, and a carbonyl nickel powder having an average particle size of 1.3 μm serving as an electroconductive material, and mixing in the ratios set forth in terms of volume percentage in Table 1 below. A predetermined quantity of a 1% water solution of CMC serving as a thickener was added to each of the mixtures prepared above and agitated until the mixture components were uniformly mixed together to provide a slurry of the mixture. Each of the slurry mixtures obtained was applied to both sides of a porous nickel substrate sheet and then dried and roll-pressed to form a hydrogen-occlusion electrode plate body. Each of the formed electrode plate bodies was then put into a furnace and heated under a vacuum atmosphere at a temperature of about 170° C. for two hours. Thus were manufactured the hydrogen-occlusion electrodes A through Q, respectively, as shown in Table 1.

Further, for purposes of comparison, a hydrogen-occlusion electrode R was manufactured in the same manner as described above except that a polyethylene (PE) powder was added instead of the PVdF powder as the bonding material. Additionally, a hydrogen-occlusion electrode S was manufactured using a PTFE powder instead of the PVdF powder as the bonding material and no CMC thickener was added to the mixture. This mixture was agitated so that the PTFE powder was formed into fibers. The mixture containing the fibrous PTFE was then applied and press-bonded to both sides of a porous nickel substrate sheet to form an electrode plate body which was not subjected to heat treatment. Further, another hydrogen-occlusion electrode T was manufactured in the same manner as described above except that a carbonyl nickel powder having an average particle size of 2.8 μm was used as the electroconductive material in place of the carbonyl nickel powder having an average particle size of 1.3 μm.

The residual porosity in terms of volume percentage for each of the electrodes A through T was as set forth in Table 1.

TABLE 1

(Units in Vol. %)

| ELECTRODE | HYDROGEN-OCCLUSION ALLOY | BONDING MATERIAL | ELECTRO-CONDUCTIVE MATERIAL | RESIDUAL PORES |
|---|---|---|---|---|
| A | 69 | 3 | 8 | 20 |
| B | 67 | 5 | 8 | 20 |
| C | 64 | 8 | 8 | 20 |
| D | 61 | 11 | 8 | 20 |
| E | 59 | 13 | 8 | 20 |
| F | 69 | 8 | 3 | 20 |
| G | 67 | 8 | 5 | 20 |
| H | 61 | 8 | 11 | 20 |
| I | 57 | 8 | 15 | 20 |
| J | 74 | 8 | 8 | 10 |
| K | 69 | 8 | 8 | 15 |
| L | 71 | 1 | 8 | 20 |
| M | 57 | 15 | 8 | 20 |
| N | 71 | 8 | 1 | 20 |
| O | 54 | 8 | 18 | 20 |
| P | 79 | 8 | 8 | 5 |
| Q | 49 | 8 | 8 | 35 |
| R | 64 | 8 | 8 | 20 |
| S | 64 | 8 | 8 | 20 |
| T | 64 | 8 | 8 | 20 |

Each of the electrode plates A through T was used as a negative electrode and stacked together with a nickel electrode plate serving as a positive electrode in laminate fashion with a nylon separator as thin as 0.18 mm interposed therebetween to form a battery element. The battery element was rolled up to make a spiral battery element. This spiral battery element was placed into a conventional nickel-plated steel cylindrical container. A conventional alkaline electrolyte aqueous solution was poured into the container and a cover was attached and hermetically sealed thereto resulting in a sealed-type cylindrical storage battery. The positive nickel electrode plate described above was manufactured by mixing a nickel hydroxide powder with a carbonyl nickel powder and combining the mixture with a 1.2% water solution of CMC to provide a slurry mixture. This slurry mixture was applied to a foam nickel substrate to fill up the pores of the substrate. The substrate was then dried and roll-pressed to manufacture the positive electrode plate. Storage batteries were manufactured as described above using electrode plates A through T as the negative electrode and are referred to herein as batteries A through T.

A charge-discharge cycle test, an internal pressure test, and a discharge test using different discharge rates were carried out on batteries A through T as set forth below. Batteries A through T were all AA-type, 1100 milliampere-hour (mAh) batteries.

CHARGE-DISCHARGE CYCLE TEST

For the charge-discharge cycle test, each battery was charged with 1100 milliampere (mA) current for 75 minutes and discharged with 1100 mA current to a final voltage of 1 volt (V). This test was carried out at room temperature. The test results are shown in FIG. 1.

As clearly seen from FIG. 1, batteries A through K had a very small drop in capacity even over the progression in number of charge-discharge cycles, whereas batteries L through T had a very large drop in capacity over the progression in number of charge-discharge cycles. The cause of the capacity drop as shown in FIG. 1, is believed to be due to the fact that the compounding amount of the bonding material is too low as seen in the case of negative electrode L of battery L, and the use of heat-treated molten PE and non-heat-treated or unsintered fibrous PTFE as the bonding material in electrodes R and S, respectively, instead of heat-treated PVdF. Even though the amount of the bonding material is sufficient in the cases of negative electrode R of battery R and negative electrode S of battery S, it is believed that the resulting disadvantage was due to the particles of alloy being broken into finer-sized pieces through the repetition of charge-discharge cycles and their subsequent separation from the electrode. Accordingly, deterioration of both the mechanical strength and conductivity of the electrode also resulted.

On the other hand, when the compounding amount of the bonding material is too great, as in the case of electrode M of battery M, it has been found that the polarization characteristics of the negative electrode deteriorate and the coefficient of utilization for the negative electrode is lowered. Further, when the amount of the electroconductive material is too low, as seen in the case of negative electrode L of battery L, the electroconductivity thereof is lowered and, accordingly, the coefficient of utilization is lowered. Conversely, when the amount of the electroconductive material is too great, as in the case of negative electrode O of battery O, there has been observed no improvement proportional to the increased amount with respect of the electroconductivity and, in fact, a shorter battery life in terms of charge-discharge cycles results. The specific reason for this has not yet been determined. Further, when the amount of the residual pores is too low, as with negative electrode P of battery P, it is believed that the gas absorptivity of the electrode is poor thereby preventing the maintenance of a good charge-discharge characteristic for a long period of time and easy deterioration. Conversely, when the residual porosity is too great, as seen with negative electrode Q of battery Q, it has been found that the alloy particles are susceptible to separating from the electrode more easily and the coefficient of utilization for the electrode lowers sharply. Further, when the average particle size of the electroconductive material is too large, even when a sufficient compounding amount is used as seen with negative electrode T of battery T, the electroconductivity and the coefficient of utilization of the electrode deteriorates.

In contrast with the deficient negative electrodes described above, the negative electrodes A through K of batteries A through K, having composition ratios as shown in Table 1 and a heat-treated PVdF electroconductive material having an average particle size 1.3 μm or less, are provided with a network formed by the heat-treated bonding material which firmly holds the fine-sized particles of the alloy powder in position to prevent them from separating from the electrode and at the same time reinforcing the mechanical strength of the electrode. Further, the fine-sized particles of the electroconductive material adhere to the surfaces of the fine-sized alloy particles as if to plate the latter particles thereby assuring good electroconductivity which results in a satisfactory coefficient of utilization for the electrode. Additionally, the porosity of the electrode due to the residual pores, as set forth in volume percentages in Table 1, bring about good gas absorptivity, good infiltration and diffusion of the electrolyte into the electrode, and good occlusion and release of hydrogen in conjunction therewith resulting in the maintenance of the capacity over the progression in number of charge-discharge cycles at a level essentially as high as that present in the initial charge-discharge operation.

INTERNAL PRESSURE TEST

The internal pressure test was carried out so that all the batteries were charged with 1100 mA current for 4.5 hours and discharged with 220 mA current to a final voltage of 1 V. The charge-discharge operation was carried out at 20° C. The test results are shown in Table 2. The internal pressure is set forth in terms of kilogram-force per centimeter squared (kgf/cm$^2$).

TABLE 2

| BATTERY | INTERNAL PRESSURE (kgf/cm$^2$) | BATTERY | INTERNAL PRESSURE (kgf/cm$^2$) |
| --- | --- | --- | --- |
| A | 5.2 | L | 15.1 |
| B | 5.1 | M | 25.3 |
| C | 4.8 | N | 11.2 |
| D | 6.5 | O | 13.6 |
| E | 8.0 | P | 21.0 |
| F | 5.5 | Q | 30.2 |
| G | 5.0 | R | 16.7 |
| H | 6.9 | S | 14.4 |
| I | 7.0 | T | 13.2 |
| J | 7.5 | | |
| K | 5.8 | | |

As clearly seen from Table 2, batteries A through K all had low internal pressure whereas batteries L through T had remarkably high internal pressure when overcharged with a high current. This difference in internal pressure is believed to be due to the use of a different component ratio for each electrode as shown in Table 1, the use of a different bonding material and different electroconductive material, and whether the electrode material was heat-treated or not. All of these are believed to be factors causing differences in the battery properties obtained, such as hydrogen occlusion-release performance, charge-discharge performance, electroconductivity attributable to the electroconductive material used, bonding characteristics, and gas absorptivity.

DISCHARGE TEST USING DIFFERENT DISCHARGE RATES

The discharge test was carried out so that all the batteries were charged with 220 mA for 7.5 hours and discharged to a final voltage of 1 V using three different discharge rates, namely, 220 mA [0.2 Coulomb(C)], 1650 mA (1.5 C) and 3300 mA (3.0 C). This test was carried out at 20° C. The test results are shown in Table 3.

TABLE 3

| BATTERY | 0.2 C | 1.5 C | (Units in mAh) 3.0 C |
| --- | --- | --- | --- |
| A | 1198 | 1078 | 982 |
| B | 1190 | 1055 | 975 |
| C | 1189 | 1080 | 990 |
| D | 1150 | 1022 | 966 |
| E | 1144 | 1011 | 956 |
| F | 1177 | 1063 | 973 |
| G | 1170 | 1062 | 977 |
| H | 1172 | 1067 | 970 |
| I | 1169 | 1065 | 971 |
| J | 1174 | 1058 | 968 |
| K | 1178 | 1064 | 963 |
| L | 1189 | 1055 | 961 |
| M | 1155 | 924 | 751 |
| N | 1160 | 986 | 812 |
| O | 1180 | 1060 | 965 |
| P | 1183 | 1063 | 973 |
| Q | 1130 | 920 | 740 |
| R | 1166 | 1014 | 898 |
| S | 1173 | 1009 | 889 |
| T | 1159 | 989 | 869 |

As clearly seen from Table 3, batteries A through K had a very small drop in their capacity even with a very high current as compared with batteries L through T. Batteries A through K have good discharge characteristics.

Thus, batteries A through K had good results with respect to each of the charge-discharge cycle test, the internal pressure test and the discharge test using different discharge rates.

Further, it has been found that a hydrogen-occlusion electrode for a storage battery can be obtained having improved charge-discharge cycle characteristics and internal pressure characteristics when containing a thickener in an amount of not more than about 0.5 wt. % based on the weight of the hydrogen-occlusion alloy contained in the electrode.

A hydrogen-occlusion alloy contained in a hydrogen-occlusion electrode serves to occlude and release hydrogen in an aqueous solution of alkaline electrolyte during charge and discharge of the battery. Such occlusion and release of hydrogen take place right on the surfaces of the alloy which are exposed to the electrolyte. According to the present invention, when the thickener content in the electrode is limited to not more than about 0.5 wt. %, the exposed surfaces of the alloy are increased as compared with a conventional electrode in which about 1 wt. % of a thickener based on the weight of the hydrogen-occlusion alloy is used. Accordingly, when a thickener in an amount of the present invention is used, a longer charge-discharge cycle life, a higher capacity retention or preservation rate, and a lower internal pressure of a sealed-type alkaline storage battery is achieved.

Since the content of the thickener contained in the hydrogen-occlusion electrode manufactured according to the present invention is very low, the surfaces of the particles of hydrogen-occlusion alloy are hardly covered with the thickener, so that the area of active surfaces exposed to the electrolyte are increased. Due to this increase in the active surface area performing the occlusion and release of hydrogen, there is brought about favorable effects such as a longer battery life in terms of charge-discharge cycles, a higher capacity retention rate and a lower internal pressure in a sealed-type alkaline storage battery containing an electrode with a thickener in an amount of not more than about 0.5 wt. %. While it has been found that the effects as noted above can be obtained when the compounding ratio of a thickener is up to approximately 0.5 wt. % based on the weight of the hydrogen-occlusion alloy in the electrode, it has also been found that when the thickener content is less than 0.01 wt. %, that it is difficult to handle the mixture adequately. Therefore, it is preferable to use the thickener in an amount of at least about 0.01 wt. % based on the weight of the alloy.

Specific examples are set forth below showing the advantages obtained in using a thickener according to the present invention.

EXAMPLE 2

A hydrogen-occlusion alloy composed of $MmNi_{3.5}Co_{1.0}Al_{0.5}$ was pulverized into fine particles to produce a hydrogen-occlusion alloy powder. A nickel powder, as commercially sold under the tradename INCO Type- 210, in an amount of 15 wt. % based on the weight of the alloy powder was added to the alloy powder as the electro-conductive material. Additionally, a PVdF powder in an amount of 3 wt. % based on the weight of the alloy powder was added to the mixture. As the thickener, a CMC powder in an amount of 0.10 wt. % based on the weight of the alloy powder was dissolved in water to prepare an aqueous solution of the thickener which was then added to the mixture. The components were mixed uniformly and kneaded together to obtain a slurry mixture. This slurry mixture was applied to both sides of a perforated nickel substrate sheet, dried and roll-pressed to obtain a formed electrode plate body. This electrode plate body was put into a furnace where it was heated at 170° C. for 2 hours in a vacuum atmosphere to manufacture a hydrogen-occlusion electrode plate. This electrode plate is designated herein as "Electrode A".

Additionally, except that the CMC thickener was used in an amount of 0.5 wt. % based on the weight of the hydrogen-occlusion alloy powder, the same conditions and process as described above with respect to Electrode A were carried out to manufacture another hydrogen-occlusion electrode plate. This electrode is designated herein as "Electrode B".

Further, except that the CMC thickener was used in an amount of 0.80 wt. % based on the weight of the hydrogen-occlusion alloy powder, the same conditions and process as described above with respect to Electrode A were carried out to manufacture another hydrogen-occlusion electrode plate which is designated herein as "Comparison Electrode C".

Each of Electrode A and Electrode B of the present invention and Comparison Electrode C were then used as a negative electrode. Each negative electrode was stacked in a laminate fashion with a positive electrode having a 18 mm thick nylon separator interposed between the positive and negative electrodes. This laminate was then wound into a spiral form to obtain a spiral battery element. Each of the respective battery elements was inserted into a cylindrical nickel-plated steel container. A predetermined quantity of a conventional alkaline electrolyte was poured into the battery container and a cover was then attached and hermetically sealed to the container to provide a cylindrical sealed-type storage battery. The positive electrode plate utilized was manufactured by (1) mixing a nickel hydroxide powder with a commercially available INCO Type-255 Ni powder and a water solution of CMC to make a slurry mixture, (2) applying the mixture to a foam nickel substrate plate so as to fill up the pores of the substrate, and (3) drying and roll-pressing to a predetermined thickness to produce a positive electrode plate.

Using battery A provided with Electrode A, battery B provided with Electrode B, and battery C provided with Comparison Electrode C, a charge-discharge cycle test and an internal pressure test were carried out as described below. The batteries tested were AA-size batteries having a rated capacity of 1000 mAh.

CHARGE-DISCHARGE CYCLE TEST

For the charge-discharge cycle test, each battery was charged with 1 ampere (A) current for 75 minutes and discharged with 1 A current to a final voltage of 1 V. This test was carried out at room temperature. The test results are shown in FIG. 2.

Figure 2:
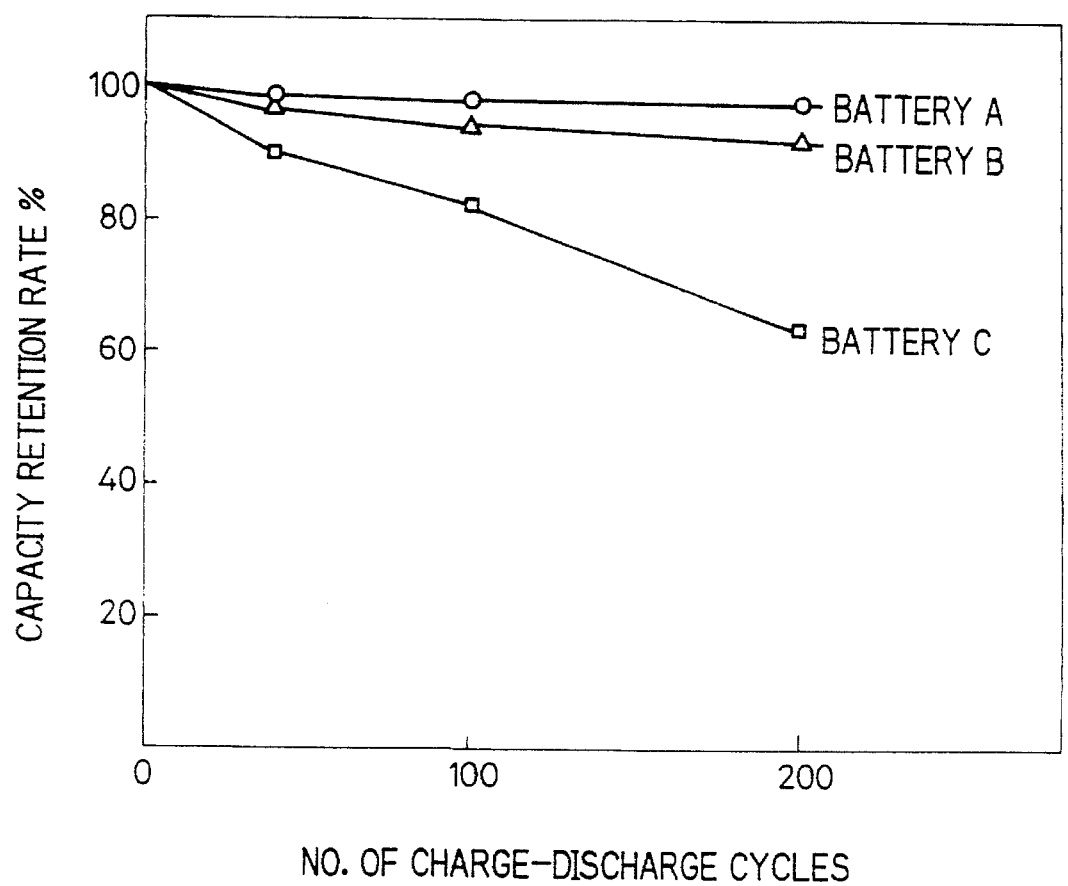
FIG. 2 is a graph showing the improvement effects obtained on the charge-discharge characteristics of batteries which contain hydrogen-occlusion electrodes of the present invention.

As clearly seen from FIG. 2, battery C had a large decrease in its capacity over the progression of the number of charge-discharge cycles, whereas battery A and battery B showed little decrease in capacity and maintained a 90% or higher capacity retention rate even at the 200th cycle of the charge-discharge operation. The reason for this difference is believed to be due to the fact that Electrode C contained a greater amount of the CMC thickener in terms of weight percentage. Negative Electrode C would have had almost all the surfaces of the particles of powdered alloy therein covered with CMC thereby leaving a much smaller area of exposed surface to occlude and release hydrogen. Accordingly, battery C failed to effectively cope with the high-rate current of 1 A used in the charge-discharge operation. Battery A and battery B would have had much smaller portions of the surfaces of the particles of powdered alloy covered with the CMC thickener because they each contained lower amounts of CMC thereby leaving a greater surface area exposed to the electrolyte. Accordingly, a high surface activity capable of occluding and releasing hydrogen efficiently, even at the times of charge and discharge operation with a high-rate current of 1 A, was able to be maintained.

INTERNAL PRESSURE TEST

For the internal pressure test, the batteries were charged with 1 A current for 4.5 hours and discharged with 0.2 A current to a final voltage of 1 V. This test was carried out at a temperature of 20° C. The test results are shown in the Table 4.

TABLE 4

| Battery | Internal pressure (kgf/cm$^2$) |
|---------|-------------------------------|
| A | 6 |
| B | 6 |
| C | 12 |

As clearly seen from Table 4, battery A and battery B had a much lower internal pressure as compared with battery C. It is therefore believed that, in the case of Electrode A and Electrode B, more surface area of the hydrogen-occlusion alloy particles was not covered by CMC and therefore a greater surface area of the alloy remained exposed allowing for a more efficient absorption of the oxygen generated from the positive electrodes while at the same time having a higher charge efficiency. All of these actions combine to prevent the negative electrode from generating pressure within the battery and to maintain a lower internal pressure.

As compared with the above, it is believed that in battery C the hydrogen-occlusion alloy particles in the negative electrode had almost all of their surfaces covered with CMC leaving only a very small portion exposed to the electrolyte. Accordingly, oxygen generated from the positive electrode could not be absorbed efficiently and a decrease in charge efficiency of the negative electrode was caused. These effects combined resulted in a remarkably high rise in internal pressure.

Therefore, as shown, when the content of the thickener in a hydrogen-occlusion electrode is not more than about 0.5 wt. %, based on the weight of the hydrogen-occlusion alloy contained in the electrode, a sealed-type storage battery using this electrode will have improved charge-discharge characteristics and a lower internal pressure.

As will be apparent to one skilled in the art, various modifications can be made within the scope of the aforesaid description. Such modifications being within the ability of one skilled in the art form a part of the present invention and are embraced by the appended claim.

It is claimed:

1. A method of manufacturing a hydrogen-occlusion electrode comprising (1) forming an electrode plate body using an electrode comprising, based on volume percentage of said electrode, a mixture of from about 42–84 volume % of a hydrogen-occlusion alloy, from about 3–13 volume % of a polyvinylidene fluoride bonding material, and from about 3–15 volume % of an electroconductive material having an average particle size of about 1.3 μm or smaller, wherein said electrode has from about 10–30 volume % of residual pores; and (2) heat treating said electrode plate body in a vacuum or inert gas atmosphere at a temperature in the range of from about 160° C. to 200° C.

* * * * *